March 23, 1948. F. A. RUSSELL 2,438,417
AMPLITUDE CONTROLLED CURRENT REGULATOR
Filed March 1, 1946 2 Sheets-Sheet 1
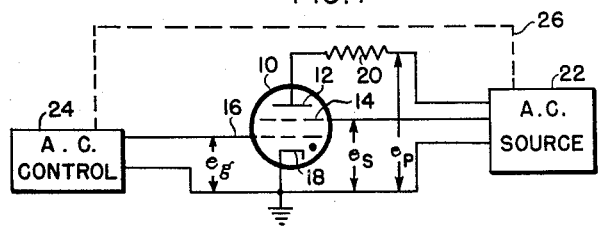
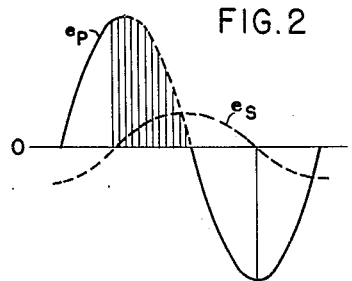
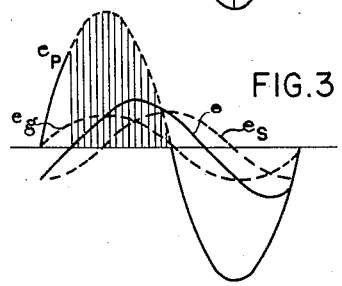
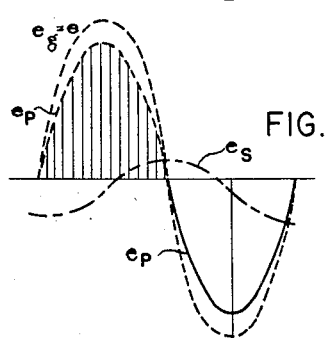
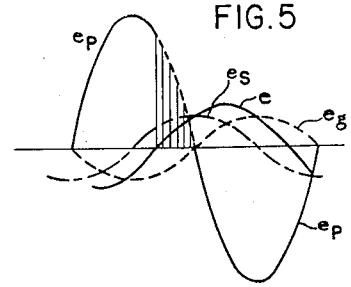
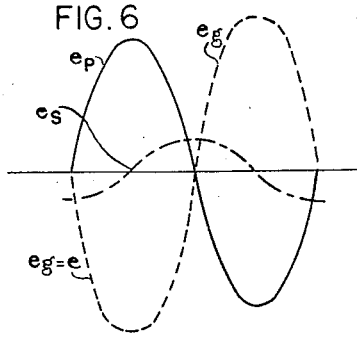
*INVENTOR.*
FREDERICK A. RUSSELL
BY
William D. Hall
*ATTORNEY*

March 23, 1948.   F. A. RUSSELL   2,438,417
AMPLITUDE CONTROLLED CURRENT REGULATOR
Filed March 1, 1946   2 Sheets-Sheet 2
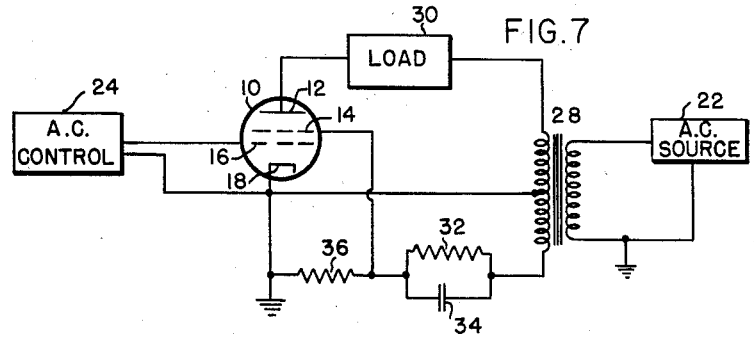
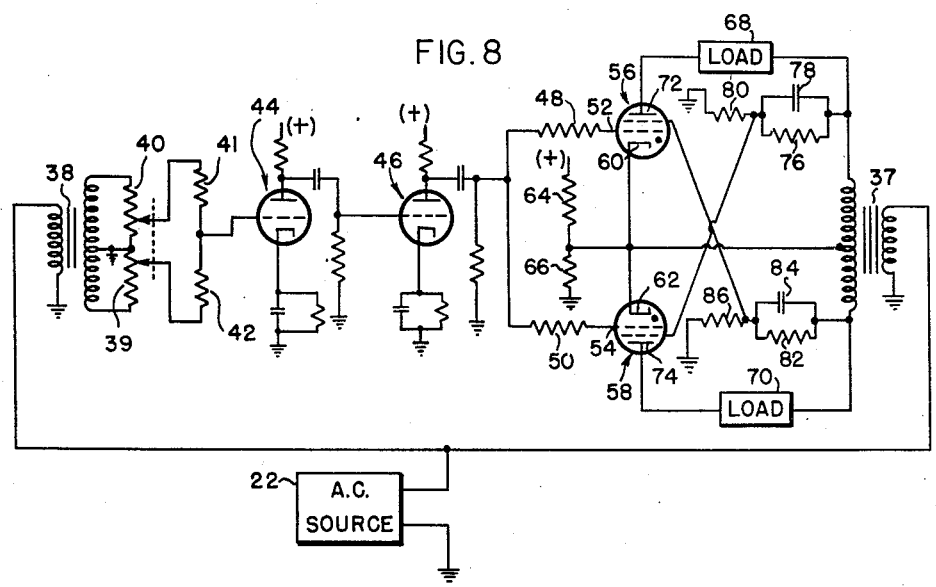
*INVENTOR.*
FREDERICK A. RUSSELL
BY
William D. Hall
*ATTORNEY*

Patented Mar. 23, 1948

2,438,417

UNITED STATES PATENT OFFICE 2,438,417

AMPLITUDE CONTROLLED CURRENT REGULATOR

Frederick A. Russell, Summit, N. J., assignor to the United States of America as represented by the Secretary of War Application March 1, 1946, Serial No. 651,307

1 Claim. (Cl. 171—119)

1

This invention relates to electrical circuits for use in control systems and more particularly to circuits for controlling the average current which flows through a load.

An example of use of the present invention would be in a servo mechanism wherein a sinusoidal control voltage may vary in amplitude from a maximum through zero to a maximum out of phase relation to control the magnitude and direction of rotation of some device such as an antenna, an indicator or other motor driven device. Apparatus used heretofore for controlling the average D.-C. current through a load have utilized phase controlled rectifiers. In these control circuits the phase of a sinusoidal voltage applied to a control grid of a rectifier or control tube is varied with respect to the sinusoidal voltage which is being rectified, thus varying the portion of each half cycle during which the control tube conducts. In many instances it is easier to obtain a voltage which varies in amplitude than to obtain a voltage which varies in phase in accordance with data which it is desired to transmit to a motor or other device.

It is an object of the present invention, therefore, to provide an improved circuit in which controlled rectification is obtained by utilization of a control voltage which varies in amplitude rather than in phase.

For a better understanding of the invention, together with other and further objects thereof, reference is had to the following description taken in connection with the accompanying drawings in which:

Fig. 1 is a schematic wiring diagram of a circuit illustrating the basic principles of the present invention;

Figs. 2, 3, 4, 5, and 6 illustrate the waveforms of the voltages applied to certain elements of the circuit of Fig. 1 and which further illustrate the manner of operation of the circuit of Fig. 1;

Fig. 7 is a diagram of a typical circuit for control of the current supplied to one load in accordance with the present invention; and Fig. 8 is a diagram of a typical circuit for control of the currents supplied to two loads in push-pull fashion.

Reference is now had to the drawings and more particularly to Fig. 1 thereof. The simplified circuit shown in Fig. 1 is here utilized to illustrate the principle of operation of the present invention, and includes a gas tube 10 having four electrodes, namely, a plate 12, a screen grid 14, a control grid 16, and a cathode 18. The plate 12 is connected through a load resistor 20 to an

2

A.-C. source 22. The screen grid 14 is also connected to the A.-C. source 22. One terminal of the A.-C. source is grounded as is the cathode 18. One terminal of an A.-C. control source 24 is grounded, and a second terminal is connected to the control grid 16. A dashed line 26 connecting the A.-C. source 22 with the A.-C. control 24 indicates that the A.-C. control 24 may be synchronized or controlled initially by the A.-C. source 22. The voltages on the control grid 16 and screen grid 14 with respect to ground are designated by $e_g$ and $e_s$, respectively. The voltage applied across the plate circuit of tube 10 including load 20 is designated by $e_p$.

A gas tube as specified has the primary advantage over a vacuum tube in that it has a high-current low-voltage characteristic and hence is particularly useful as a controlled rectifier. A gas tube is inherently an off-on tube, and its control grid or grids have little effect upon the amount of conduction after conduction starts. The average current which flows through such a tube may, however, be varied by control of the time at which the tube starts conducting in its cycle of operation.

Reference is now had to Figs. 2 through 6 inclusive which illustrate characteristics of the circuit of Fig. 1. In Fig. 2 the sinusoidal curve labeled $e_p$ is the waveform of the voltage applied to the load 20 of the control tube 10. The curve $e_s$ represents the voltage applied to the screen grid 14, and in the examples given in Figs. 2 through 6 is in phase quadrature with curve $e_p$. The voltage applied to the control grid 16 is, in Fig. 2, assumed to be zero. The gas tetrode has characteristics such that when the plate 12 is positive with respect to the cathode 18 and both grids are at cathode potential the tube will conduct. In certain actual embodiments this conductive condition may be obtained by application of appropriate D.-C. bias voltages. Since the screen grid 14 is physically located farther from the cathode 18 than is the control grid 16, it is less effective in its control than is the control grid 16. However, the ratio of the sensitivity of the two grids remains substantially constant. Therefore, the curve $e_s$ in Figs. 2 through 6 represents in amplitude the effective voltage applied to the screen grid 14. If the ratio of sensitivity of the two grids were, for example, 3, then the actual voltage applied to the screen grid 14 would be three times that represented by the curve $e_s$ in Figs. 2 through 6 inclusive. Under the conditions outlined above and with reference to Fig. 2, the tube 10 will conduct for one-fourth of a cycle beginning at the time when the voltage $e_s$ passes through zero during a positive half cycle of $e_p$. This portion of the complete cycle of the curve $e_p$ during which the tube 10 conducts is shaded in Fig. 2.

In Fig. 3 the curves $e_p$ and $e_s$ are again as in Fig. 2. The voltage $e_g$ applied to the control grid 16 is here shown as having a small value in phase with the voltage $e_p$. A curve designated by $e$ is the resultant or sum of the curves $e_s$ and $e_g$. The tube 10 conducts when this resultant curve $e$ passes through zero, and as before, the portion of the cycle during which the tube 10 conducts is shaded. In Fig. 4 the amplitude of the curve $e_g$ has been increased to such an extent that the resultant or summation of $e_g$ and $e_s$ yields a resultant $e$ which is so nearly the same as $e_g$ that it is here represented by the same curve as $e_g$. In this instance the tube 10 conducts throughout substantially all of one-half cycle of the curve $e_p$. In Fig. 5 the curve $e_g$ has been reversed in polarity and is shown as having a small magnitude. The curve $e$ again represents the resultant or the summation of the curves $e_s$ and $e_g$. The tube 10 here conducts less than one-fourth of the complete cycle of $e_p$. In Fig. 6 the voltage $e_g$ is shown as having been increased greatly in magnitude such that the summation of $e_g$ and $e_s$ is substantially equal to $e_g$ and is therefore represented by the same wave. Under this latter condition the tube 10 will not conduct during any portion of the cycle.

The conditions illustrated in Figs. 2 through 6 show how the conduction of the tube 10 may be controlled from a maximum to zero. If the phase of the signal $e_s$ is other than in quadrature with the voltage $e_p$, the conduction of the tube 10 cannot be controlled throughout this complete variation. However, in certain instances it is desirable to restrict the period of conduction of the tube 10 to less than the complete variation shown here. For example, it may be required that the control voltage reach a predetermined amplitude before any control is obtained.

Fig. 7 illustrates a practical embodiment of the invention, which comprises tube 10 having a plate 12, screen grid 14, control grid 16, and cathode 18. The A.-C. source 22 is connected to a transformer 28. The secondary of the transformer 28 is center tapped. One end of the secondary winding of the transformer 28 is connected through a load 30 to the plate 12. The load 30 may be any load which it is desired to control, for example, it may be a resistor, a relay, a magnetic clutch, or a winding of a D.-C. motor. The center tap of the secondary winding of the transformer 28 is connected to the cathode 18 and to ground. The remaining end of the secondary winding of the transformer 28 is connected through a parallel combination of a resistor 32 and a capacitor 34 to a resistor 36, the remaining end of which is grounded. The junction of the resistor 36 with the parallel combination of the resistor 32 and capacitor 34 is connected to the screen grid 14. As an example of typical values which may be used for a substantially 135 degree phase relationship between signals applied to the screen grid 14 and to the plate circuit including load 30, the frequency of A.-C. source 22 may be 400 cycles, resistors 32 and 36 may be 500,000 and 25,000 ohms, respectively, and capacitance 34 may have a value of .001 microfarad. If a phase relationship of 45 degrees is desired, the parallel combination of the resistor 32 and capacitor 34 may be connected to the same end of the secondary winding of the transformer 28 to which the load 30 is connected. The A.-C. control 24 is connected to the control grid 16, as in Fig. 1.

The operation of the circuit of Fig. 7 is analogous to the operation of the circuit of Fig. 1. The current flowing through the load 30 can be varied from a maximum to a minimum by variation of the A.-C. control 24.

Reference is now had to Fig. 8 of the drawings which illustrates a circuit diagram of an embodiment of the present invention in which the currents in two loads may controlled in a push-pull fashion. The A.-C. source 22 is connected to the primary windings of transformers 37 and 38. The secondary windings of transformers 37 and 38 are center tapped. Across the secondary winding of transformer 38 potentiometers 39 and 40 are serially connected. The junction of the potentiometers 39 and 40 is connected to the center tap of the secondary winding of transformer 38 and to ground. The contact arms of the potentiometers 39 and 40 are mechanically connected together in such a manner that when they are moved to increase the amplitude of the signal on one of the two arms the amplitude of the signal on the remaining arm is decreased. Resistors 41 and 42 are serially connected between the contact arms of the potentiometers 39 and 40. The junction between the resistors 41 and 42 is connected to a conventional voltage amplifier 44. The output of the amplifier 44 is connected to a second voltage amplifier 46. Other stages of amplification may be added if desired, or one or both of the two shown may be eliminated if desired. The output of the amplifier 46 is connected through isolating resistors 48 and 50 to the control grids 52 and 54 of gas tetrode tubes 56 and 58. The cathodes 60 and 62 of the control tubes 56 and 58 are connected to a voltage divider network which comprises resistors 64 and 66 and which provides proper biasing conditions for the tubes 56 and 58. The cathodes 60 and 62 are also connected to the center tap of the secondary winding of the transformer 37. The ends of the secondary winding of the transformer 37 are respectively connected through loads 68 and 70 to the plates 72 and 74 of tubes 56 and 58. The loads 68 and 70 may, for example, be magnetic clutches, relays, or the windings of motors. Another form which the loads 68 and 70 might take would be the windings of an Amplidyne. The junction between the load 68 and the secondary winding of the transformer 37 is connected through a parallel combination of a resistor 76 and capacitor 78 to a resistor 80, the remaining end of which is grounded. The junction between the resistor 80 and the parallel combination of the resistor 76 and capacitor 78 is connected to the screen grid of the tube 58. The junction of the load 70 and the secondary winding of the transformer 37 is connected through the parallel combination of a resistor 82 and a capacitor 84 to a resistor 86, the remaining end of which is grounded. The junction of the resistor 86 and the parallel combination of the resistor 82 and the capacitor 84 is connected to the screen grid of the tube 56.

The network which includes the transformer 38, potentiometers 39 and 40 and resistors 41 and 42, allows the amplitude of the signal applied to the amplifier 44 to be varied from a maximum through zero and to a maximum in a negative direction. The position of the contact arms on the potentiometers 39 and 40 may be varied manually or by mechanical means. The specific manner by which this is done will, of course, depend upon the specific use which is made of this invention. The output from the aforementioned network is applied through the amplifiers 44 and 46, wherein it is amplified, to the control grids 52 and 54 of the control tubes 56 and 58. The signals applied to the plates 72 and 74 of the tubes 56 and 58 are in 180 degree phase opposition, as are the signals applied to the screen grids of these tubes. The signals applied to the control grids of the tubes 56 and 58 are mutually in phase, and in phase with the signal at the plate of one of the tubes 56 and 58, and out of phase with the signal at the plate of the remaining tube. Thus a variation in the amplitude of the signal from the amplifier 46 will cause the current to increase in one of the loads 68 or 70 and to decrease in the remaining load.

The circuit shown in Fig. 8 produces control of the current in the loads 68 and 70 except for a dead spot, or region of no control, over a small region in which the output of amplifier 46 is near zero. This dead spot may be eliminated by modification of the circuit in such a manner that the signals applied to the screen grid and plate of each control tube 56 and 58 are in phase quadrature. The extent of the dead spot may be controlled by varying the constants of the networks which include resistors 76, 80, 82 and 86, and capacitors 78 and 84.

The circuit of Fig. 8 may be employed as a part of a servo system to cause a driver such as a motor to position any desired device such as an antenna array in a radio system in accordance with the setting of a potentiometer. To utilize the circuit of Fig. 8 in this manner the contact arms of the potentiometers 39 and 40 are mechanically disassociated, one being then associated with the device to be positioned, for example the antenna array, and the remaining contact arm being manually adjusted to a position corresponding to the position it is desired that the antenna attain. The loads 68 and 70 are utilized in a differential manner such as in a motor having two field windings. The direction of rotation of the motor as well as its speed of rotation is then determined by the relative currents in the two windings, which currents are in turn determined by the relative positions of the contact arms on potentiometers 39 and 40. The windings of the motor are energized in such a manner that the motor will rotate the antenna in such a direction as to reduce the displacement error in the arms of potentiometers 39 and 40 to a minimum.

The invention herein disclosed will also function with vacuum tubes rather than gas tubes. Because of the high current ordinarily required in control work the use of gas tubes having two or more electrodes is preferred.

It will be apparent to those skilled in the art that where a gas rectifier tube having only one grid is to be used, in place of multi-grid tubes, the control voltage and the voltage which is applied to the screen grid in the foregoing embodiments may be combined by use of a suitable network and the resultant voltage applied to the one grid. A suitable network may consist of a common impedance across which the two signals are applied. However, because this requires a more complicated circuit, and involves loss of gain and a slight phase shift caused by interaction of the two signals, the two-grid tube circuits disclosed herein are preferable.

While there has been described what are at present considered to be the preferred embodiments of the invention, it will be obvious to those skilled in the art that various changes and modifications may be made therein without departing from the invention.

What is claimed is:

An electrical circuit for controlling the D.-C. currents which flow through first and second loads in a push-pull manner, said circuit comprising an A.-C. source, means associated with said A.-C. source for providing a control voltage which may be varied in amplitude from a maximum in the positive direction through zero to a maximum in the negative direction, first and second gas type electron tubes each having at least plate, cathode, screen grid and control grid elements, transformer means having a center tap on the secondary winding thereof connected to said cathode elements, and being associated with said A.-C. source for applying a portion of the output thereof through said first and second loads to said plate elements in 180 degree phase opposition, first and second phase shifter means associated with said transformer means and connected to said screen grid elements, said first and second phase shifter means being adapted to excite said screen grids of said first and second gas tubes substantially in 180 degree phase opposition, and means for applying said control voltage to both said control grids in phase, whereby the average current flowing through said first and second loads may be controlled in a push-pull manner by variation of the amplitude of said control voltage.

FREDERICK A. RUSSELL.

REFERENCES CITED

The following references are of record in the file of this patent:

UNITED STATES PATENTS

| Number | Name | Date |
|---|---|---|
| 2,001,837 | Craig | May 21, 1935 |
| 2,150,265 | Conover | Mar. 4, 1939 |